United States Patent
Conley (10) Patent No.: US 9,614,882 B2
(45) Date of Patent: *Apr. 4, 2017

(54) SYSTEM INDEPENDENT REMOTE STORING OF DIGITAL CONTENT

(71) Applicant: Google Inc., Mountain View, CA (US)

(72) Inventor: James Edward Conley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/882,447

(22) Filed: Oct. 13, 2015

(65) Prior Publication Data

US 2016/0119396 A1    Apr. 28, 2016

Related U.S. Application Data

(63) Continuation of application No. 13/406,407, filed on Feb. 27, 2012, now Pat. No. 9,161,075.

(51) Int. Cl.
| | |
|---|---|
| *H04L 29/06* | (2006.01) |
| *H04L 21/00* | (2006.01) |
| *H04L 12/927* | (2013.01) |
| *H04L 29/08* | (2006.01) |
| *H04N 21/2747* | (2011.01) |
| *H04N 21/254* | (2011.01) |

(52) U.S. Cl.
CPC .......... *H04L 65/4084* (2013.01); *H04L 21/00* (2013.01); *H04L 47/808* (2013.01); *H04L 65/607* (2013.01); *H04L 67/26* (2013.01); *H04N 21/2541* (2013.01); *H04N 21/2747* (2013.01)

(58) Field of Classification Search
CPC ..... H04L 21/00; H04L 65/4084; H04L 67/26; H04L 47/808; H04N 21/2747
See application file for complete search history.

(56) References Cited

U.S. PATENT DOCUMENTS

| | | | |
|---|---|---|---|
| 9,161,075 B2 * | 10/2015 | Conley | .................. H04L 21/00 |
| 2004/0193648 A1 | 9/2004 | Lai et al. | |
| 2010/0228975 A1 | 9/2010 | Lipka et al. | |
| 2010/0266009 A1 | 10/2010 | Sedeffow | |
| 2011/0225417 A1 | 9/2011 | Maharajh et al. | |
| 2012/0011571 A1 | 1/2012 | Moroney et al. | |
| 2012/0297423 A1 | 11/2012 | Kanojia et al. | |
| 2012/0324052 A1 | 12/2012 | Paleja et al. | |
| 2013/0097315 A1 | 4/2013 | Hao et al. | |
| 2013/0254308 A1 | 9/2013 | Rose et al. | |
| 2013/0304647 A1 | 11/2013 | Cohen et al. | |
| 2014/0115034 A1 | 4/2014 | Cohen et al. | |
| 2014/0115722 A1 | 4/2014 | Cohen et al. | |

* cited by examiner

*Primary Examiner* — Larry Donaghue (74) *Attorney, Agent, or Firm* — Fenwick & West LLP (57) ABSTRACT

A system and a method are disclosed for a content delivery system that enable system-independent, remote storing of digital content on any number of a user's devices. The system and method enable a user to designate a digital content item appearing in a web page for storage, as well as a specific, separate device on which to store the content item. The digital content item is not restricted to being viewed or accessed within the content delivery system, but rather the content delivery system enables remote storing of digital content across multiple different systems, from multiple different content sources, for viewing on multiple different devices for any given user.

20 Claims, 8 Drawing Sheets

SYSTEM INDEPENDENT REMOTE STORING OF DIGITAL CONTENT

CROSS REFERENCE TO RELATED APPLICATIONS

This application is a continuation of U.S. Non-Provisional Application Ser. No. 13/406,407, filed on Feb. 27, 2012, which is incorporated by reference in its entirety.

BACKGROUND

1. Field of Art

The disclosure generally relates to the field of digital content access, and more particularly to remote storing of digital content.

2. Background of the Invention

Large volumes of digital video content are readily available through the Internet. Search engines like GOOGLE™ and video hosting services like YOUTUBE™ make it easy to find and access this content. However, it is not always convenient for users to watch video content that they find interesting, and some users would prefer to watch such content at a later time, or on another device. For example, a user may find an interesting video while using their smartphone, and desire to watch the video later on using their home computer. Typically, a user would bookmark the content through the host site or send himself an email with a link to the content in order to access the content on the home computer.

At the home computer, the user must return to the host site and retrieve the bookmarked item, or access the item by first going to an email account. Thus, the user is restricted to accessing the content through a given host site or service. Furthermore, when the user later accesses the content, the user is further restricted to viewing the content on a specific set of devices. For web based videos, they would be restricted to watching the video on a device that has a web browser. In either case, the process is haphazard and entirely dependent on the user's initiative and skill.

Additionally, content that the user wishes to view may contain digital rights management (DRM) restrictions that limit the number or type of device that it can play on. For example, a user may freely view a video on their mobile device, but the video's DRM restrictions prevent playback on computers.

SUMMARY

A content delivery system that enables system-independent, remote storing of digital content on any number of a user's devices. The system enables a user to designate a digital content item appearing in a web page for storage, as well as a specific, separate remotely located device on which to store the content item. The digital content item is not restricted to being viewed or accessed within the content delivery system, but rather the content delivery system enables remote storing of digital content across multiple different systems, from multiple different content sources, for viewing on multiple different devices for any given user.

In one embodiment, information identifying a digital content item is included for display by a digital content provider associated with a digital content item. The digital content item can appear on a digital content provider page. For example, the digital content item can be on a playback page from which the content item can be played, such as page on a video or audio hosting system, or on a search result page including a link to the digital content item in the search results, or an embedded content on a page on a blog site, a social network site, a news site, or the like. The digital content provider page could be an advertisement for, with a link to, the digital content item, an email including a link to the digital content item, or any other web page in which the digital content item can be represented by a hyperlink. Along with the information identifying the digital content item there is provided a user interface element, such as a "Store" button, or the like, that enables the user to initiate a request to store the digital content item on user selected viewing device.

In response to a user's selection of the Store button, the content delivery system identifies the user and provides a user-specific device list; the user can be identified by login information, cookies or other means. The user-specific device list is a list of remote devices operated or managed by the user, and on which the user can play back the digital content item. The list of remote devices preferably include at least one device other than the requesting device the user is currently using to access the content delivery system. For example if the user is accessing the content delivery system using a smartphone, the remote devices can include the user's home computer, work computer, a network attached storage device, and so forth. The user selects a remote device, and this selection is received by the content delivery system. The content delivery system then accesses the digital content item from a content source. The content source may be local content source associated with the content delivery system, or an independent, third party content source. The content delivery system then sends, or causes to be sent, the content item to the user's selected device, where it is stored, effectively being "Stored" by the selected device for later access by the user. Additionally, the content delivery system may limit the devices included in the device list based on DRM requirements associated with the digital content item or the content source. The content delivery system may reformat or transcode the content into a format that is compatible with the selected device.

In certain embodiments, the content item is delivered to the user's selected device using one or more of a push, pull, or key-based delivery methods. In a push delivery method, the content item is sent to the selected device, where it is stored. In a pull delivery method, the selected device requests the content from the content delivery system, for example after being notified by content delivery system that the content is available, or during periodic communications with the content delivery system. In a key-based delivery method, the content delivery system obtains a key from the content source that has the content item, and then sends the key to the selected device. The selected device uses the key to retrieve the content directly from the content source.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description relate to various embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
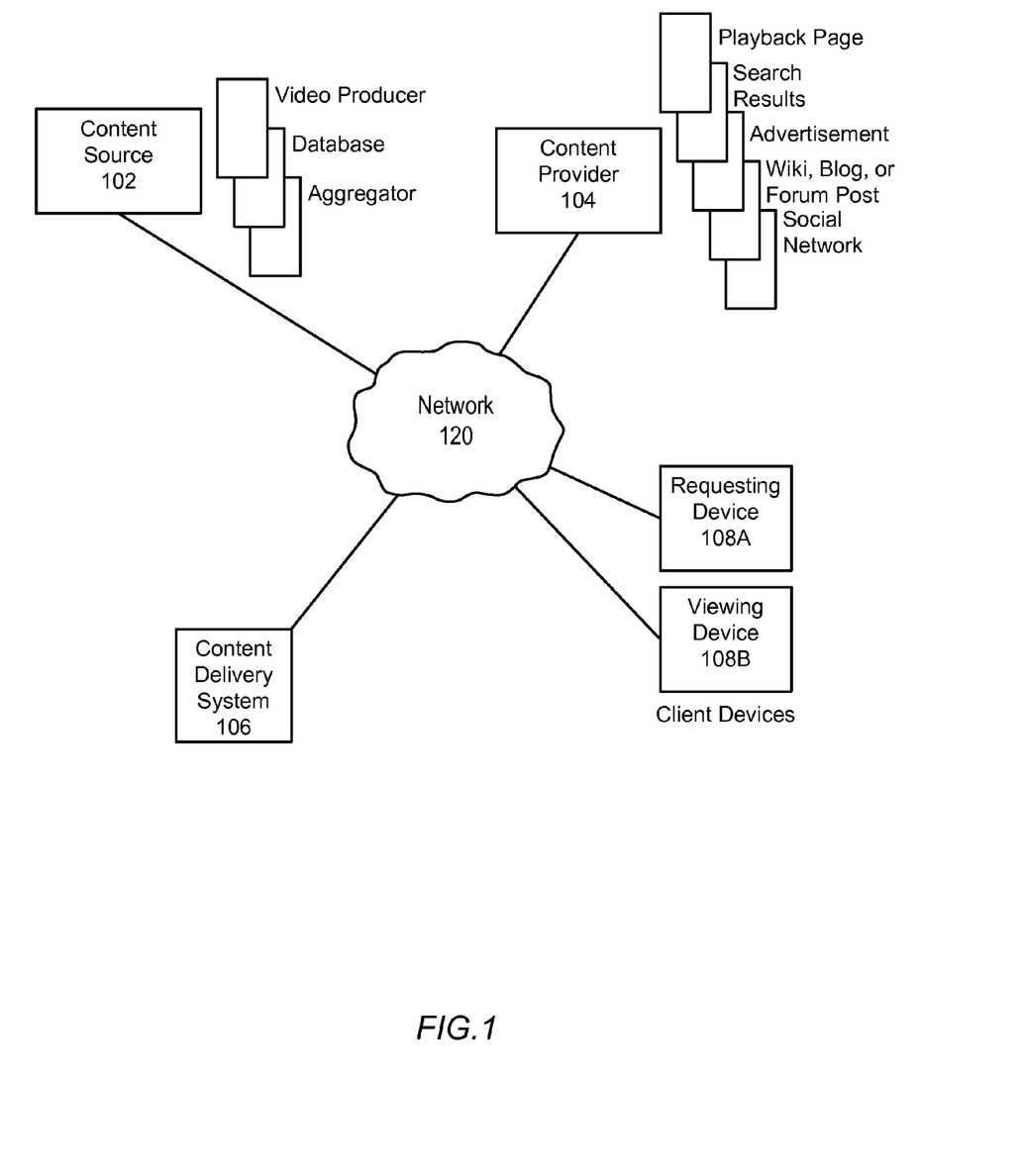
FIG. 1 illustrates one embodiment of a system environment supporting a content delivery system.

FIG. 1 illustrates one embodiment of a system environment supporting a content delivery system. The system environment includes one or more content sources 102, one or more content providers 104, one or more content delivery systems 106, and one or more requesting devices 108A and viewing devices 108B. These components are connected by a network 120. Various examples of both the content sources 102 and the content providers 104 are shown. Note that, for the sake of clarity, FIG. 1 depicts only one instance of content source 102, third party content provider 104, content delivery system 106, requesting device 108A, and viewing device 108B, though there could be any number of each.

The content sources 102 are any source of digital content. There are a variety of different types of content sources. Content sources 102 include creators of content, such as a video producer, for example television and cable networks and broadcasters, motion picture studios, music publishers, record labels, independent artists, and the like. Content sources may also provide the functionality of the content provider pages described below.

The content providers 104 provide direct or indirect access for the client devices 108 to the digital content from the digital content sources 102, but unlike content sources do not generally create the content that they make available, instead obtaining and/or aggregating that content from content sources. The content providers include video hosting sites, such as YOUTUBE™, search engines, such as GOOGLE SEARCH™, advertisers, such as DOUBLECLICK™, or a social network such as GOOGLE+™. A content provider that aggregates and/or stores content may function as a content source 102 for other content providers 104 or the content delivery system 106.

The content providers provide one or more content provider pages. A content provider page has a digital content item embedded therein for direct playback, or contains a link to the digital content item or another content provider page. Content providers pages can include, but are not limited to, playback pages, search results, advertisements, and social networks. Specific examples of content providers are described below for illustrative purposes, and they do not exhaust the types or sub-types of content providers.

Figure 4A:
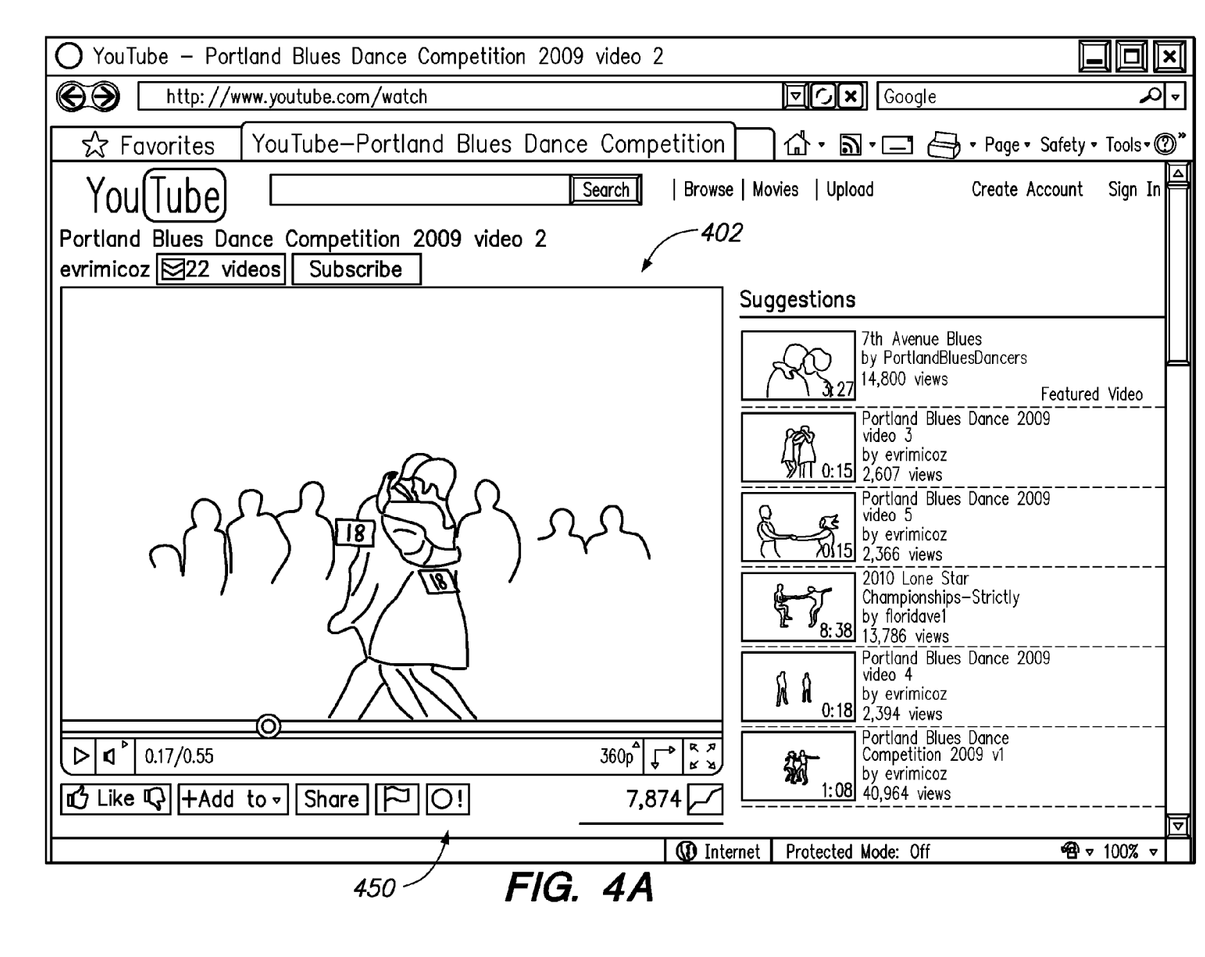
FIG. 4A illustrates a Store button embedded into a content provider page, according to one embodiment.

One type of a content provider page is a video playback page, in which the digital content item is embedded and can be directly played, such as a web page on a video or audio hosting system, such as YOUTUBE™. FIG. 4A illustrates an example of a playback page including an embedded digital content item 402. A Store button 450 is displayed which enables the user to initiate the request to store the linked digital content item to a selected viewing device 108B.

Figure 4B:
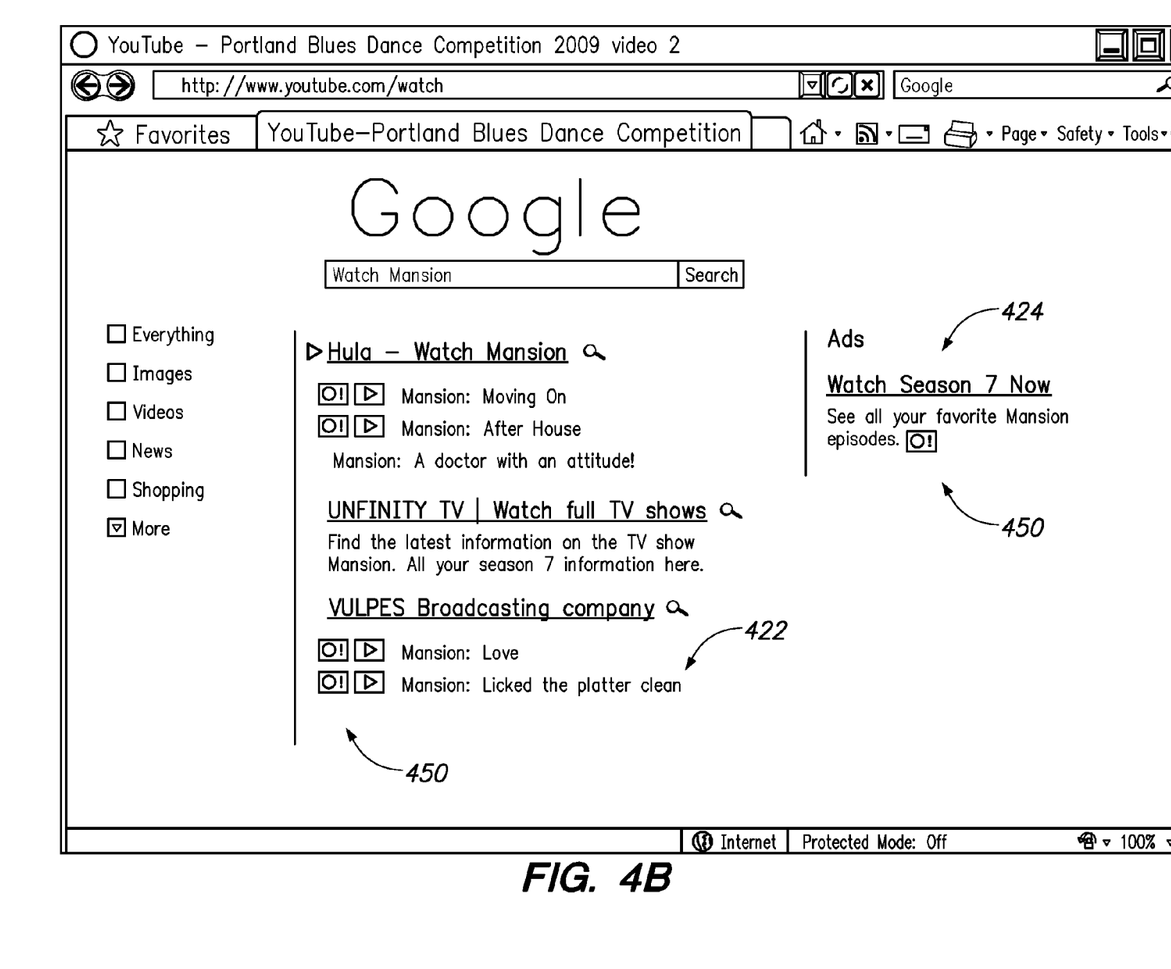
FIG. 4B illustrates a Store button embedded into search results and textual advertisements, according to one embodiment.

Another type of content provider page is a search results page, wherein one or more links to digital content items are displayed in response to a search query (not shown), for example GOOGLE SEARCH™. The links may refer directly to a content source 102, for example a link for immediate download. The links may also refer to an alternative content provider, such as a playback page described above with respect to FIG. 4A. FIG. 4B illustrates an example of a search results page with a link to a digital content item 402. Again, the Store button 450 is displayed which enable the user to initiate the request to store the linked digital content item to a selected viewing device 108B.

Figure 4C:
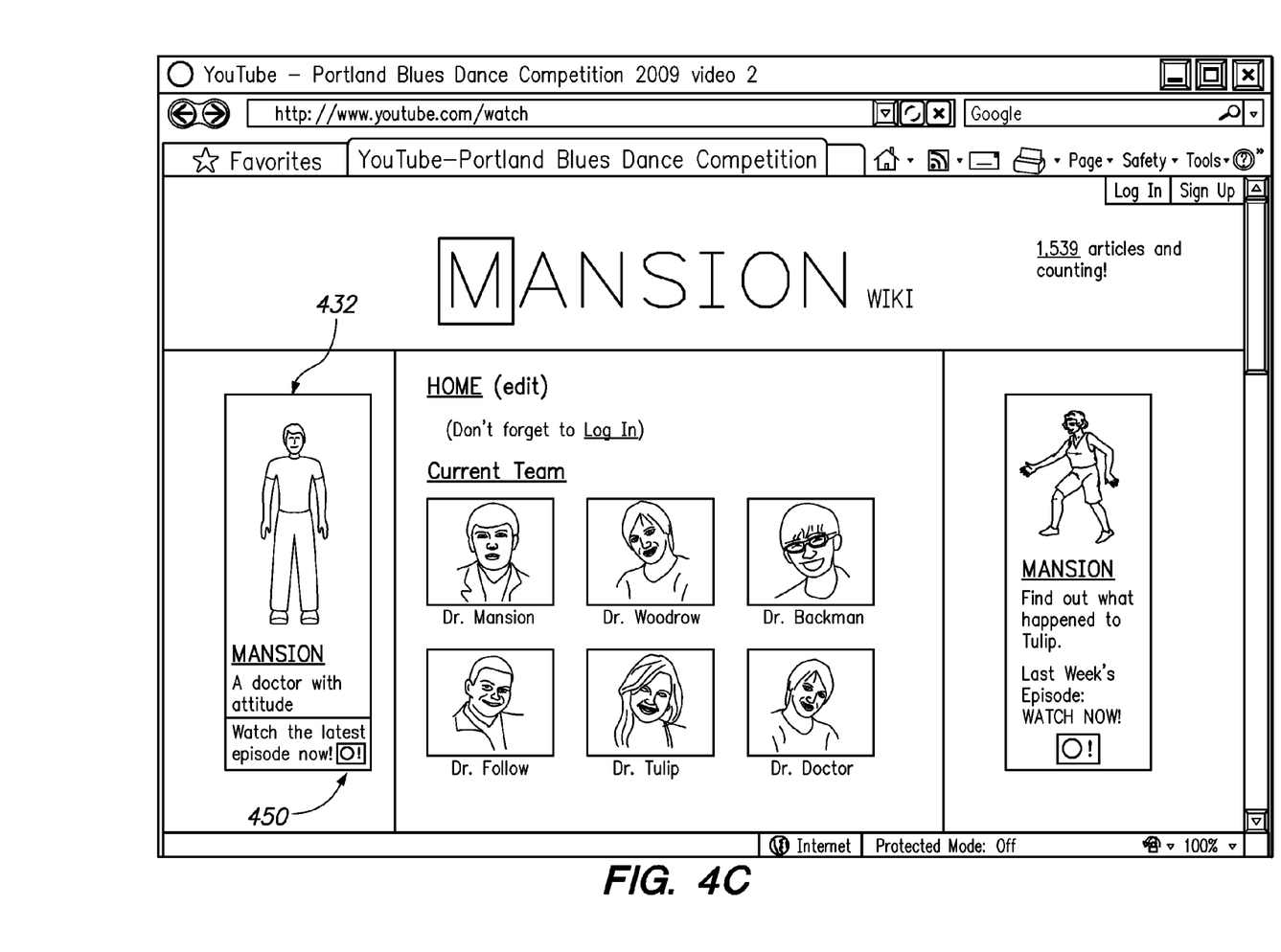
FIG. 4C illustrates a Store button embedded into pictorial advertisements, according to one embodiment.

Another type of content provider page is an advertisement, wherein a content item provided by a content source 102 is advertised to a client device 108. The advertisement can be graphical, wherein it displays a picture or animation associated with the content item, or it may be textual, where it displays text related to the content item, or a combination of both. The advertisement may contain a link that refers directly to a content source 102, for example a link for immediate download. The link may also refer to an alternative content provider, such as a playback page described above with respect to FIG. 4A. The link may alternatively refer to a purchase page, where a user can purchase access rights to the content. FIG. 4B illustrates an example of a textual advertisement 424, and 4C illustrates examples of a graphical advertisement 432, both including Store buttons 450.

Another type of content provider page is a social network site, wherein a post, link, or status update contains one or more links that directly refer to a content item provided by a content source 102. The link may also refer to an alternative content provider, such as a playback page described above with respect to FIG. 4A. The social networking service may contain textual or graphical content related to the content item, and a may include an embedded video from a content source, providing similar functionality as the playback page above with respect to FIG. 4A. FACEBOOK™ and GOOGLE+™ are example social networking services.

The content delivery system 106 facilitates the remote storing of digital content items, such as video or audio content items. The content delivery system 106 interacts with and exchanges data between the content sources 102, the content providers 104, and the client devices 108 over the network 120. The content delivery system 106 is described in more detail below with respect to FIG. 2.

A client device 108 is a computing device that executes client software, e.g., a web browser or built-in client application, to connect to the content source 102, content provider 104, or content delivery system 106 via a network 120 and to display or playback digital content items. The client device 108 might be, for example, a personal computer, a laptop, a personal digital assistant, a cellular, mobile, or smart phone, a set-top box, a digital video recorder (DVR) or any other network enabled consumer electronic ("CE") device. In some embodiments, the client 108 includes a video player such as, for example, the FLASH™ player from Adobe Systems, Inc. or any other player. With respect to a given user, the client devices 108 include at least one requesting device 108A, which is used to request that content be Stored from the content delivery system 106, and at least one viewing device 108B which is used to access the remotely Stored content from the content delivery system 106. The viewing device(s) preferably include at least one device other than the requesting device the user is currently using to access the content delivery system. For example if the user is accessing the content delivery system using a smartphone, the remote devices can include the user's home computer, work computer, a network attached storage device, and so forth. Alternatively, the requesting device 108A and the viewing device 108B may be the same client device.

Note that the terms "client" and "content provider" as used herein may refer to software providing client and content providing functionality, to hardware devices on which the software executes, or to the entities operating the software and/or hardware, as is apparent from the context in which the terms are used.

Figure 2:
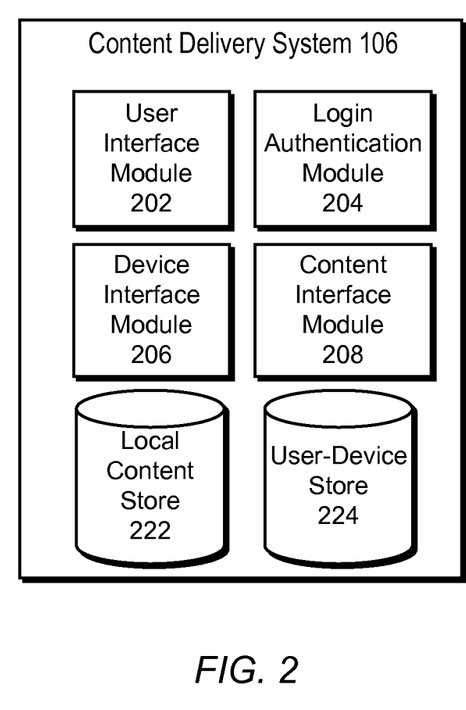
FIG. 2 illustrates one embodiment of a content delivery system.

The network 120 facilitates communication between the various components of the system environment. The network 120 is typically the Internet, but may be any network(s), including but not limited to a LAN, a MAN, a WAN, a mobile wired or wireless network, a private network, or a virtual private network, or a combination thereof Referring now to FIG. 2, illustrated is one embodiment of a content delivery system 106. The content delivery system 106 includes a user interface module 202, a device interface module 206, a content interface module 208, a local content store 222, and a user-device store 224. A content delivery system 106 is implemented by one or more server-class computers, including one or more processor cores, memory (e.g., 12 GB or more), storage (e.g., 1 TB or more), networking support (e.g., 10 gigabit Ethernet), and then further configured in accordance with the above described modules. Conventional elements (e.g., firewall, load balancers, administrative layers, etc.) are not shown in FIG. 2 so as to not obscure the details of the system.

The user-device store 224 stores for each user (having a user ID) a list of one or more viewing devices 108B that have been identified by the user as being devices on which the user can store and playback digital content items. For each such viewing device 108B, there is stored information such as a device identifier, device type, platform (e.g., operating system), the network location at which the viewing device 108B can be accessed, and/or any necessary access or operation parameters, such as password or keys necessary to access the viewing device 108B. The user-device store 224 also stores user account information for the user, such as the user credentials (e.g., user name and password) for the content delivery system 106, user billing and payment information (e.g., credit card information), and/or the user account information (e.g. user name and password) on third party systems where the user has previously created accounts for accessing digital content items.

The user interface module 202 provides the content delivery system 106 with a means to communicate with the requesting client device 108A. The user interface module 202 provides the requesting client device 108A with a user interface (UI) to access and control the content delivery system 106, and receives any input from that UI. In one embodiment, the user interface module 202 receives a username and password from the requesting client device 108A. The user interface module 202 then interfaces with the user-device store 224 to identify the user by authenticating the username and password. The user interface module may also rely on smart cards or biometric authentication, or locally stored cookies. Once identified, the user interface module retrieves the list of the user's device(s) from the user-device store 224, whereby the user can select a device for receiving and storing digital content items. If there is only one device associated with the user, it may be selected automatically.

Figure 4D:
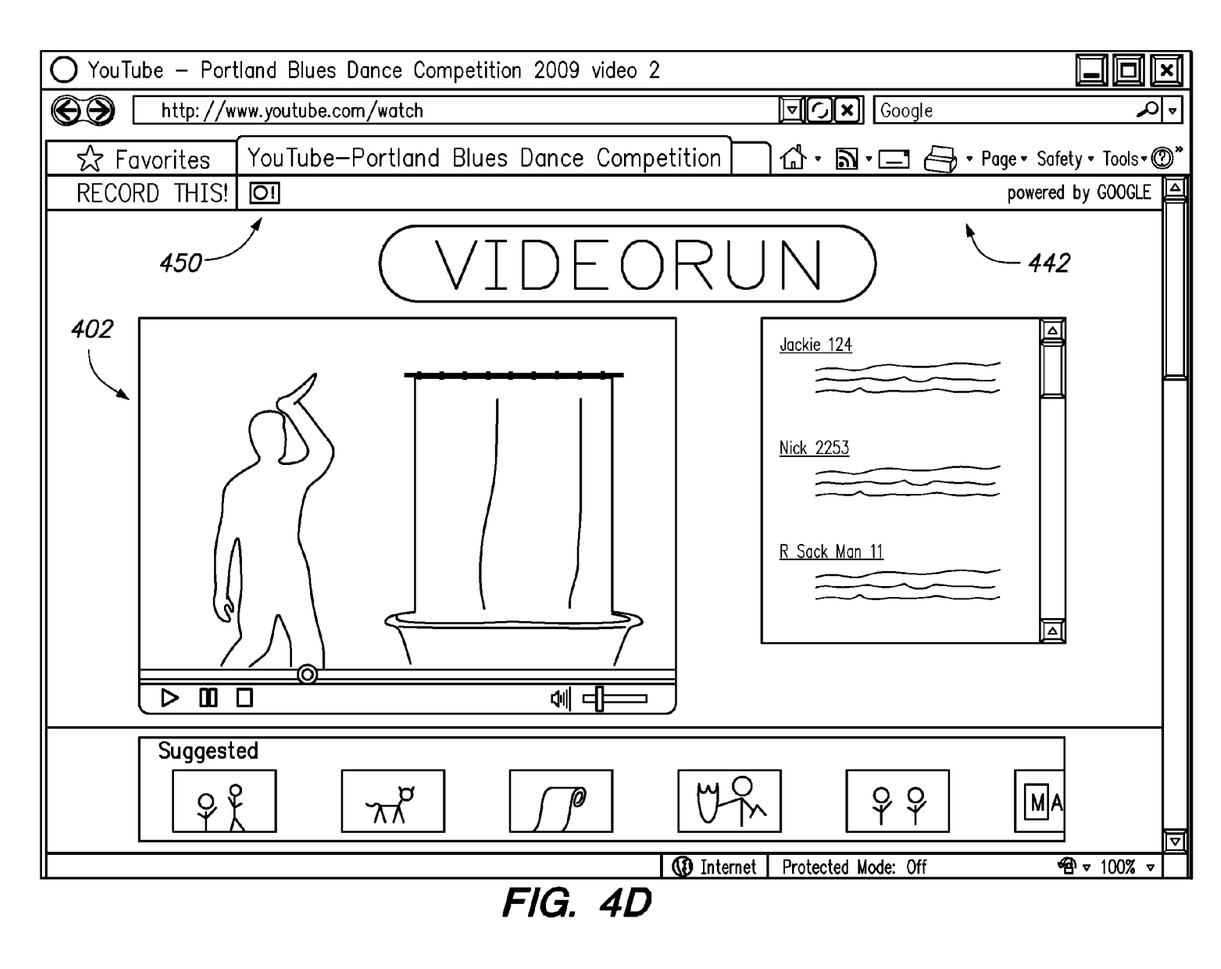
FIG. 4D illustrates a Store button embedded into a browser toolbar, according to one embodiment.

The user interface module 202 is also capable of interfacing with a browser plug-in, such as a toolbar, installed on the requesting client device 108A. In such an embodiment, the browser plug-in has features that allow it to detect the content items on a content provider page. If the browser plug-in detects a content item that is compatible with the content delivery system, the browser plug-in displays or activates a Store button. The authentication of the user and the selection of the viewing device 108B may be directly facilitated by the browser plug-in instead of a UI directly provided by the user interface module. A browser toolbar is shown in FIG. 4D.

The device interface module 206 provides the content delivery system 106 with a means to communicate with the viewing devices 108B. The device interface module 206 receives a content ID and a device ID from the user interface module 202. The device interface module may request the content specified by the content ID from the content interface module 208. The device interface module 206 then receives this content or an access key for this content. In a push delivery embodiment, the device interface module 206 sends the content to the viewing device 108B upon receiving it from the content interface module without a specific request for the content from the viewing device. In a pull delivery embodiment, the device interface module 206 receives a request for content from the viewing device 108B, and then sends the content to the viewing device. In a key-based delivery embodiment, the device interface module 206 sends the access key for the content to the viewing device 108B.

The content interface module 208 provides the content delivery system 106 with a means of interfacing with the content sources 102 and the local content store 222. The content interface module 208 sends requests for content to the content sources 102 or the local content store 222, and receives content from the content sources 102 or the local content store 222, respectively. The content module 208 can receive requests for content from the device interface module 206. In a key-based delivery embodiment, the content interface module 208 may either request keys from the local content store and the content sources or generate keys for the local content store and the content sources. The content interface module 208 can also transcode audio or video content to a format compatible with the viewing device. For example, if the content is a video, and if the viewing device is a WINDOWS™ based video player, the content interface module may transcode the video to the .WMV format. To determine the correct format(s) for each viewing device, in one embodiment the content interface module refers to a known list associating viewing devices and compatible formats. This list may be stored in the content delivery system or provided by a third party. Alternatively, the content interface module may query the viewing devices to determine a compatible format. If a viewing device supports more than one format, during setup for the viewing device, the content interface module may query the user for the preferred format. The content interface module is capable of transcoding between formats and codecs, such as WebM, MPEG-4, WMV, or Flash, into other formats, as is known in the art.

The local content store 222 provides the content delivery system 106 with a local store of digital content for local push, pull and key-based delivery embodiments. The content store 222 interfaces with the content interface module 208 to provide digital content to viewing devices 108B. The local content store may function as a content source 102.

Figure 3A:
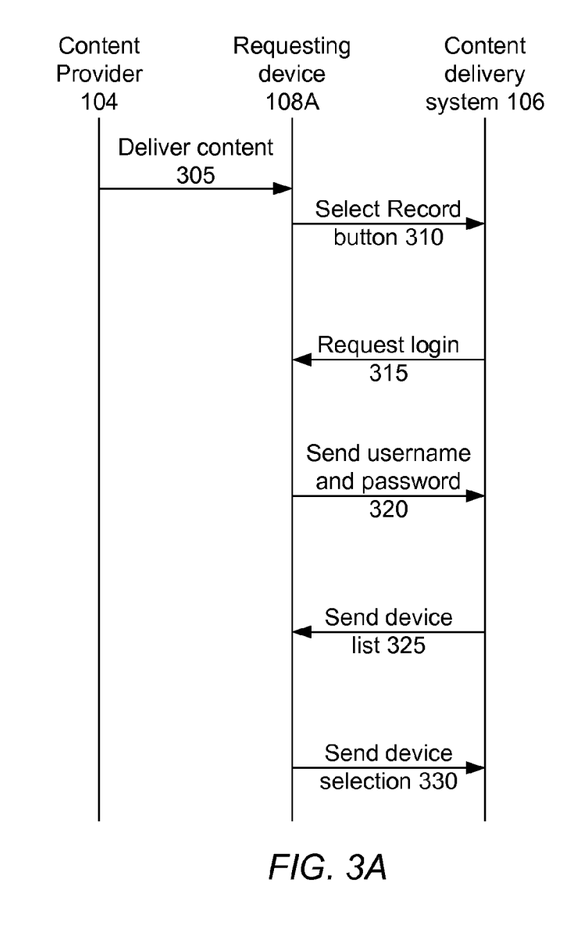
FIG. 3A is an interaction diagram illustrating content delivery, according to one embodiment.
Figure 3B:
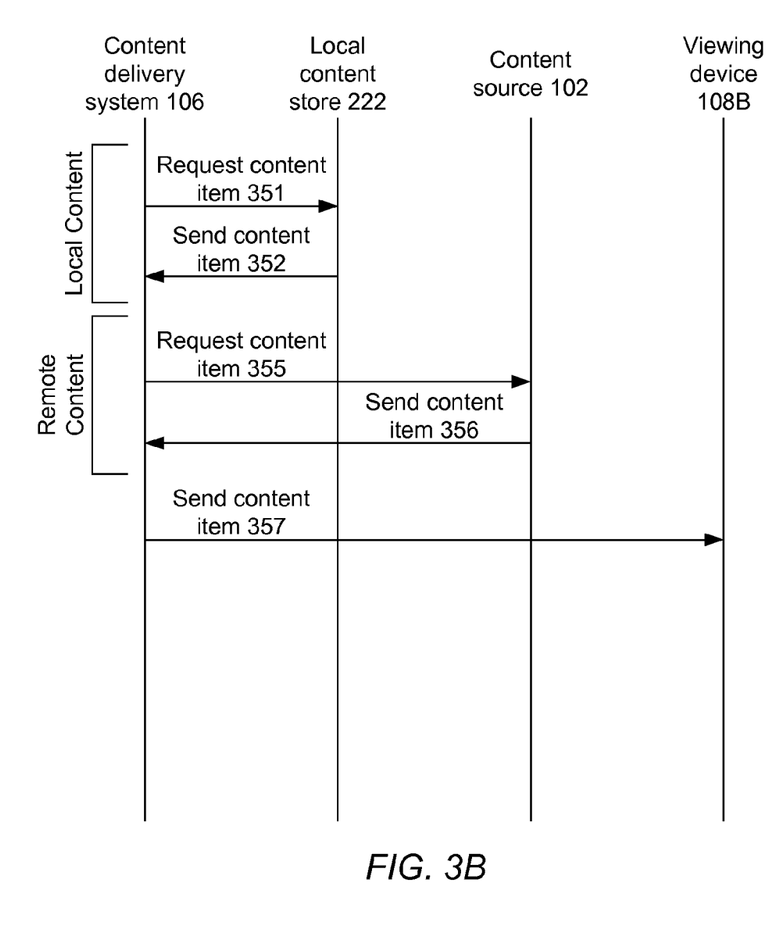
FIG. 3B is an interaction diagram illustrating content delivery, according to a push delivery embodiment.
Figure 3C:
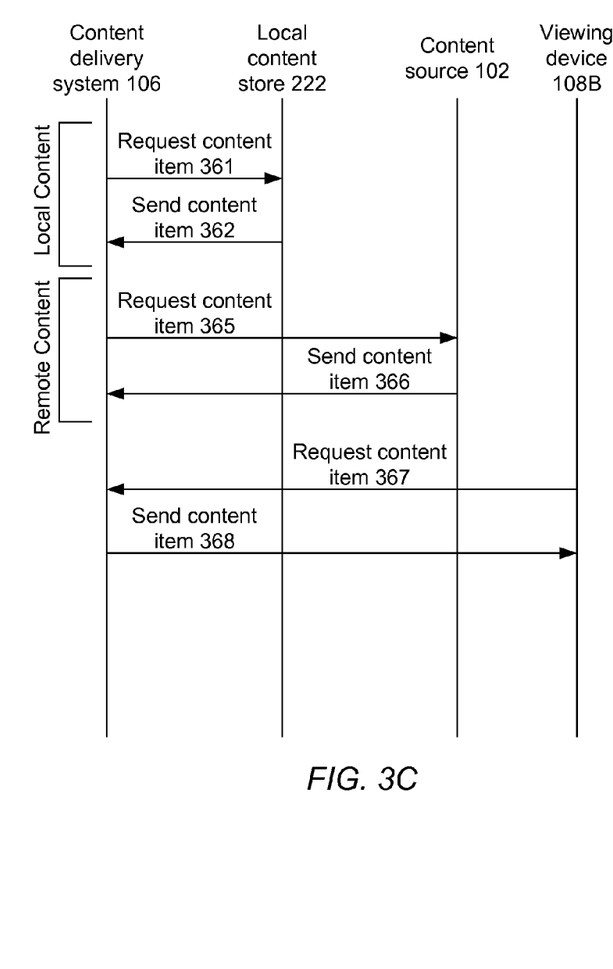
FIG. 3C is an interaction diagram illustrating content delivery, according to a pull delivery embodiment.

Referring now to FIGS. 3A, 3B, and 3C, there are illustrated various interaction scenarios for remote storing of digital content using the content delivery system 106. In the first scenario shown in FIG. 3A, the content source 102 delivers 305 the digital content item to the requesting device 108A. As mentioned above, the digital content item can be included in a number of different forms, such as one playback page (for any type of audio, video, or other media content), included as a search result in a search results page, in a social network, and so forth. The web content is presented on the requesting device 108A in conjunction with a user interface element that indicates to the user the ability to store the digital content item. FIGS. 4A through 4D provide illustrative examples.

The user using the requesting device 108A then selects 310 the Store button or similar such user interface element on the content provider page to initiate a request to store the digital content item to one of the user's viewing devices 108B. The Store button is bound to functions which take parameters such as an identifier for the digital content item (e.g., a file name, file ID, video ID), as well as contextual parameters, such as the current application in which the digital content item is being presented, referral information (e.g., identifying a provider site on which the digital content is being presented). This function calls the content delivery system 106 and passes to it the included parameters.

The user may also select 310 the Store button or similar such user interface element on a browser plug-in installed on the requesting device 108A.

The user interface module 202 in the content delivery system 106 then receives 310 this selection, which includes a content ID which specifies the digital content item referenced by the content source. The user interface module 202 the requests 315 login credentials from the requesting device 108A. In some embodiments, the user of the requesting device 108A then specifies a username and password (or alternatively, these are automatically retrieved from the memory of the requesting device 108A). The requesting device 108A then sends 320 the username and password to the user interface module 202. The user interface module 202 then authenticates the user and retrieves the user-specific device list from the user-device store 224, based on the user's credentials. In some embodiments, if necessary, the user interface module 202 will filter the user-specific device list based at least in part on digital right management (DRM) access rights for the digital content item. For example, if the DRM access rights for the digital content item specify that the content item can only be played on a GOOGLE TV™-powered device, the user interface module 202 will remove any non-GOOGLE TV™-powered devices from the list of devices. The user interface module 202 then sends 325 the device list to the requesting device 108B.

The user of the requesting device 108B then selects a device from the device list, and sends 330 this selection to the user interface module 202. The user interface module 202 then sends the selected device to the device interface module 206, and the content ID to the content interface module 208. Various embodiments of mechanisms to deliver content from the content delivery system 106 to the viewing device 108B are explained further below with respect to FIGS. 3B through 3D.

Referring now to FIG. 3B, illustrated is a push delivery embodiment. If the content delivery system 106 is set to deliver local content (content from the local content store 222), The content interface module 208 requests 351 the digital content item (using the content ID) from the local content store 222. The local content store then sends 352 the digital content item to the content interface module 208. Alternatively, if the content delivery system 106 is set to deliver remote content (content from one or more third-party content sources 102), the content interface module 208 requests 355 the digital content item (using the content ID) from the content sources 102. The content sources 102 then send 356 the digital content item to the content interface module 208. After receiving the content from either the local content store or the content sources, the content interface module sends the digital content item to the device interface module 206. The device interface module 206 then sends 357 the content to the viewing device 108B.

Referring now to FIG. 3C, illustrated is a pull delivery embodiment. If the content delivery system 106 is set to deliver local content, the content interface module 208 requests 361 the digital content item (using the content ID) from the local content store 222. The local content store then sends 362 the digital content item to the content interface module 208. Alternatively, if the content delivery system 106 is set to deliver remote content, the content interface module 208 requests 365 the digital content item (using the content ID) from the content sources 102. The content sources 102 then send 366 the digital content item to the content interface module 208. After receiving the content from either the local content store or the content sources, the content interface module then sends the digital content item to the device interface module 206. The content interface module may then send a notice, for example via email, to the viewing device 108B to inform it that the content is ready for retrieval. The viewing device 108B then requests 367 the content from the device interface module. The device interface module 206 then sends 368 the content to the viewing device 108B.

Figure 3D:
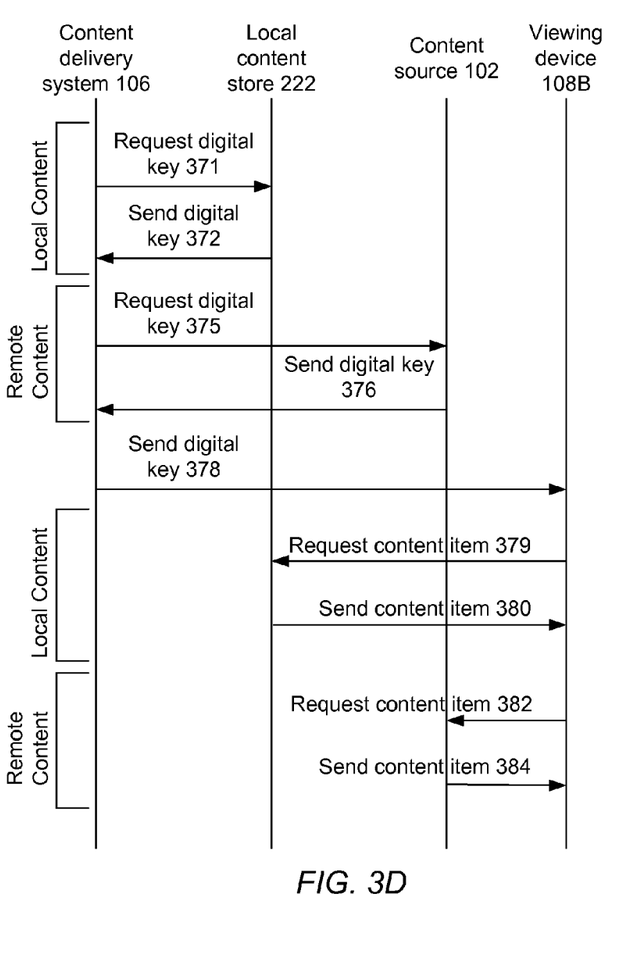
FIG. 3D is an interaction diagram illustrating content delivery, according to a key-based delivery embodiment.

Referring now to FIG. 3D, illustrated is a key-based delivery embodiment. If the content delivery system 106 is set to deliver local content, the content interface module 208 requests 371 a digital key for the content item (using the content ID) from the local content store 222. The local content store then sends 372 the digital key to the content interface module 208. Alternatively, if the content delivery system 106 is set to deliver remote content, the content interface module 208 requests 375 a digital key for the content item (using the content ID) from the third party content providers 104. The third party content providers 104 then send 376 the digital key to the content interface module 208. After receiving the key from either the local content store or the content sources, the content interface module then sends the digital content item to the device interface module 206. The device interface module 206 then sends 378 the digital key to the viewing device 108B. Depending on if the content was local or remote, the viewing device 108B then either requests 379 the content from the local content store 222 or requests 382 the content the content source 102, respectively. Then, depending on if the content was local or remote, the local content store 222 sends 380 or the content source 102 sends 384 the content to the viewing device 108B.

Example Embodiments

Referring now to FIGS. 4A through 4D, illustrated are various embodiments of the system. FIG. 4A illustrates one embodiment where the Store button 450 is embedded into a content provider page, such as a video watch page. The video watch page displays a content item 402 for a user to view. The Store button 450 allows a user to indicate to the content delivery system that they wish to store the content item 402 on one of their viewing devices.

FIG. 4B illustrates another embodiment where the Store button 450 is embedded into search results and textual advertisements. In response to a relevant search, one or more links 422 to content items 402 may be displayed in the search results. These content item links are displayed near a Store button 450 to allow a user to indicate to the content delivery system that they wish to store the content item 402 on one of their viewing devices. The search results page may also contain textual advertisements 424. If these textual advertisements link to content provider pages or content items, they may include a Store button 450 as well.

FIG. 4C illustrates another embodiment where the Store button 450 is embedded into pictorial advertisements. The advertisements 432 may be specifically generated for the page upon which they appear, or they may be selected from a pool of advertisements to appear on the page. Where the advertisements link to content provider pages or content items, they can include a Store button 450 to allow a user to indicate to the content delivery system that they wish to store the associated content item on one of their viewing devices.

FIG. 4D illustrates another embodiment where the Store button 450 is embedded into a browser toolbar. In this example, the content provider and/or the content provider page do not directly support the content delivery system, and as such do not display a Store button 450. However, if browser toolbar 442 determines that the source of the content item can be accessed by the content delivery system, then the browser toolbar will display a Store button 450 to indicate to a user that the content item on the page can be remotely stored. The browser toolbar 442 may work with the content delivery system 106 to make this determination. By selecting the Store button 450, the user can indicate to the content delivery system that they wish to store the associated content item on one of their viewing devices.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein are performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an algorithm is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as data, content, bits, values, elements, symbols, characters, terms, numbers, numerals, or the like. These words, however, are merely convenient labels and are to be associated with appropriate physical quantities.

Unless specifically stated otherwise, discussions herein using words such as processing, computing, calculating, determining, presenting, displaying, or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to one embodiment or an embodiment means that a particular element, feature, structure, or characteristic described in connection with the embodiment is included in at least one embodiment. The appearances of the phrase in one embodiment in various places in the specification are not necessarily all referring to the same embodiment.

Some embodiments may be described using the expression coupled and connected along with their derivatives. For example, some embodiments may be described using the term coupled to indicate that two or more elements are in direct physical or electrical contact. The term coupled, however, may also mean that two or more elements are not in direct contact with each other, but yet still co-operate or interact with each other. The embodiments are not limited in this context.

As used herein, the terms comprises, comprising, includes, including, has, having or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, or refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "the," "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for system-independent, remote Storing of digital content on any number of a user's devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    receiving, during playback of a digital content item, a selection of a store button viewer control from a user of a client;
    responsive to receiving the selection, sending to the client a list of viewing devices registered to the user and having DRM access rights for the digital content item;
    receiving, from the user, a selection of one of the listed viewing devices;
    transferring the digital content item in its entirety from a content source system to a content delivery system;
    receiving, from the selected viewing device, a request for the digital content item; and
    transferring the digital content item in its entirety from the content delivery system to the selected viewing device for subsequent viewing on the selected viewing device.

2. The method of claim 1, further comprising:
    sending a message to the selected viewing device, the message indicating the digital content item is available for retrieval.

3. The method of claim 1, wherein transferring the digital content item to the selected viewing device further comprises:
    transcoding the digital content item to a format compatible with the selected viewing device.

4. The method of claim 1, wherein transferring the digital content item to the selected view device further comprises:
    sending a digital key to the selected viewing device, the digital key identifying the embedded digital content item.

5. The method of claim 1, wherein the list of viewing devices registered to the user was previously provided to the server by the user.

6. The method of claim 1, wherein the digital content item is a video.

7. The method of claim 1, wherein the digital content item is an audio item.

8. A method for transferring a digital content item, the method comprising:
    displaying an advertisement to a client device over a network, the advertisement including a reference to a digital content item;
    providing user interface elements to the client device for display in association with the advertisement and the reference, the user interface elements including a user interface element for requesting transferring of the digital content item;
    receiving, from the client device, a request to transfer the digital content item;
    identifying a plurality of viewing devices registered to the client device and having DRM access rights for the digital content item;
    providing, to the client device, a list of identified viewing devices;
    receiving, from the client device, a selection of one of the identified viewing devices; and
    transferring the digital content item in its entirety from a content source system to a content delivery system.

9. The method of claim 8, further comprising:
receiving, from the selected viewing device, a request for the digital content item; and
transferring the digital content item in its entirety from the content delivery system to the selected viewing device for subsequent viewing on the selected viewing device.

10. The method of claim 8, further comprising:
sending a message to the selected viewing device, the message indicating the digital content item is available for retrieval.

11. The method of claim 8, wherein transferring the digital content item to the selected viewing device further comprises:
transcoding the digital content item to a format compatible with the selected viewing device.

12. The method of claim 8, wherein transferring the digital content item to the selected view device further comprises:
sending a digital key to the selected viewing device, the digital key identifying the embedded digital content item.

13. The method of claim 8, wherein the list of viewing devices registered to the user was previously provided to the server by the user.

14. The method of claim 8, wherein the digital content item is a video.

15. A computer program product for providing digital content items, the computer program product stored on a non-transitory computer readable medium having executable computer program instructions adapted to cause a processor to execute steps comprising:
receiving, during playback of a digital content item, a selection of a store button viewer control from a user of a client;
responsive to receiving the selection, sending to the client a list of viewing devices registered to the user and having DRM access rights for the digital content item;
receiving, from the user, a selection of one of the listed viewing devices;
transferring the digital content item in its entirety from a content source system to a content delivery system;
receiving, from the selected viewing device, a request for the digital content item; and
transferring the digital content item in its entirety from the content delivery system to the selected viewing device for subsequent viewing on the selected viewing device.

16. The computer program product of claim 15, further comprising:
sending a message to the selected viewing device, the message indicating the digital content item is available for retrieval.

17. The computer program product of claim 15, wherein transferring the digital content item to the selected viewing device further comprises:
transcoding the digital content item to a format compatible with the selected viewing device.

18. The computer program product of claim 15, wherein transferring the digital content item to the selected view device further comprises:
sending a digital key to the selected viewing device, the digital key identifying the embedded digital content item.

19. The computer program product of claim 15, wherein the list of viewing devices registered to the user was previously provided to the server by the user.

20. The computer program product of claim 15, wherein the digital content item is a video.

\* \* \* \* \*